United States Patent
Mouridsen et al.

(10) Patent No.: US 11,011,907 B2
(45) Date of Patent: May 18, 2021

(54) SURGE PROTECTION CIRCUIT WITH INTEGRATED SURVEILLANCE

(71) Applicant: SCHNEIDER ELECTRIC IT CORPORATION, West Kingston, RI (US)

(72) Inventors: Jonas Sonsby Mouridsen, Odense V (DK); Carsten Nommensen Tingskov, Fredericia (DK)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 77 days.

(21) Appl. No.: 16/418,093

(22) Filed: May 21, 2019

(65) Prior Publication Data
US 2020/0373829 A1    Nov. 26, 2020

(51) Int. Cl.
| H02H 9/04 | (2006.01) |
| H02H 9/00 | (2006.01) |
| H02J 9/06 | (2006.01) |
| H02H 7/125 | (2006.01) |

(52) U.S. Cl.
CPC .............. *H02H 9/04* (2013.01); *H02H 9/005* (2013.01); *H02J 9/06* (2013.01); *H02H 7/1252* (2013.01)

(58) Field of Classification Search
CPC ............ H02H 3/04; H02H 3/048; H02H 3/20; H02H 3/22; H02H 7/10; H02H 7/12–1252; H02H 9/005; H02H 9/02; H02H 9/04–045; H02H 9/049; H02J 3/01; H02J 3/12; H02J 3/24; H02J 9/04–063; H02J 9/068; H02M 1/32; H02M 7/062
See application file for complete search history.

(56) References Cited

U.S. PATENT DOCUMENTS

| 4,870,528 | A | * | 9/1989 | Harford | ................. H02H 9/005 361/56 |
| 6,411,482 | B1 | * | 6/2002 | Funke | .................... H02H 3/048 361/58 |
| 7,352,083 | B2 | | 4/2008 | Nielsen et al. | |
| 8,547,672 | B2 | | 10/2013 | Benton et al. | |
| 10,014,680 | B2 | * | 7/2018 | Dawley | ................. H02H 9/005 |
| 2003/0165035 | A1 | * | 9/2003 | McCook | ................ H02H 9/005 361/21 |
| 2006/0033486 | A1 | * | 2/2006 | Chou | ............... G01R 19/16585 324/102 |

(Continued)

FOREIGN PATENT DOCUMENTS

CN    205385408 U    7/2016

OTHER PUBLICATIONS

Extended European Search Report from corresponding European Application No. 20175229.2 dated Jul. 31, 2020.

*Primary Examiner* — Fred E Finch, III
(74) *Attorney, Agent, or Firm* — Lando & Anastasi, LLP

(57) ABSTRACT

According to one aspect, a power device is provided. The power device includes an input having at least a first connection and a second connection, and configured to be coupled to an AC power source to receive input AC power, a converter circuit coupled to the input and configured to convert an input AC voltage to a DC voltage, a load output configured to provide output power derived from the DC voltage, a rectifier circuit coupled to the input and having a first output and a second output, and a first capacitor coupled to the first output of the rectifier circuit and the second output of the rectifier circuit.

18 Claims, 7 Drawing Sheets

(56) References Cited

U.S. PATENT DOCUMENTS

| | | | |
|---|---|---|---|
| 2009/0207034 A1* | 8/2009 | Tinaphong | H02H 9/042 340/635 |
| 2011/0164339 A1* | 7/2011 | Schmid | H02M 1/4208 361/18 |
| 2012/0248875 A1* | 10/2012 | Fang | H02M 7/42 307/66 |
| 2013/0093595 A1 | 4/2013 | Lee et al. | |
| 2013/0129373 A1* | 5/2013 | Inukai | H02M 1/32 399/88 |
| 2013/0141182 A1* | 6/2013 | Beyerlein | H02H 3/33 333/17.2 |
| 2013/0222858 A1 | 8/2013 | Yokoyama | |
| 2014/0218827 A1* | 8/2014 | Inukai | G06F 1/26 361/18 |
| 2019/0074761 A1 | 3/2019 | Matsuda | |
| 2019/0267887 A1* | 8/2019 | Kojima | G03G 15/5004 |
| 2020/0052484 A1* | 2/2020 | Zahrte, Sr. | H02H 9/04 |
| 2020/0244204 A1* | 7/2020 | Wang | H02M 1/44 |

* cited by examiner

SURGE PROTECTION CIRCUIT WITH INTEGRATED SURVEILLANCE

BACKGROUND

1. Field of Invention

At least one aspect of the present invention relates generally to surge protection of electronic equipment.

2. Discussion of Related Art

The use of power devices, such as uninterruptible power supplies (UPS), to provide regulated, uninterrupted power for sensitive and/or critical loads, such as computer systems and other data processing systems, is known. Whenever electronic equipment, such as a UPS, is connected to a grid, the equipment may be exposed to voltage transients (surges) due to upstream failures, coupling of large transformers and motors and lightning strikes.

SUMMARY

According to one aspect, a power device is provided. The power device includes an input having at least a first connection and a second connection, and configured to be coupled to an AC power source to receive input AC power, a converter circuit coupled to the input and configured to convert an input AC voltage to a DC voltage, a load output configured to provide output power derived from the DC voltage, a rectifier circuit coupled to the input and having a first output and a second output, and a first capacitor coupled to the first output of the rectifier circuit and the second output of the rectifier circuit.

The power device may further include a second capacitor coupled between the first connection and the second connection. and may include a third capacitor coupled between the first connection and ground. In the power device, the input may further include a third connection and a fourth connection, and the rectifier circuit may be a three-phase rectifier circuit. The first capacitor may be a first type of capacitor, and the second capacitor and the third capacitor may be a different type of capacitor than the first type. The second capacitor may be an X capacitor and the third capacitor may be a Y capacitor. The power device may further include a backup storage device, and the power device may be configured to provide backup power from the backup storage device to the output in a backup mode of operation. The power device may further include a counter circuit coupled to the second capacitor and configured to count a number of transients that occur at the input, and the counter circuit may be configured to determine a magnitude of a transient. The power device may include a controller coupled to the counter circuit, and the controller may include an interface configured to provide transient count data to an external device. The power device may include a resistor coupled between the second capacitor and the second connection, a first diode coupled to a first end of the resistor and a second diode coupled to the second end of the diode.

Another aspect is directed to a surge protection circuit for protecting a device from power surges. The surge protection circuit includes an input having at least a first connection and a second connection, and configured to be coupled to an AC input and a downstream component relative to the surge protection circuit, a rectifier circuit coupled to the input and having a first output and a second output, and a first capacitor coupled to the first output of the rectifier circuit and the second output of the rectifier circuit and configured to receive a power surge at the input through the rectifier circuit to protect the device.

The surge protection circuit may include a second capacitor coupled between the first connection and the second connection and a third capacitor coupled between the first connection and ground. In the surge protection circuit, the input may include a third connection and a fourth connection, and the rectifier circuit may be a three-phase rectifier circuit. The first capacitor may be a first type of capacitor, and the second capacitor and the third capacitor may be a different type of capacitor than the first type. The second capacitor may be an X capacitor and the third capacitor may be a Y capacitor. The surge protection circuit may include a counter circuit coupled to the second capacitor and configured to count a number of transients that occur at the input, and the counter circuit may be configured to determine a magnitude of a transient. The surge protection circuit may further include a controller coupled to the counter circuit, wherein the controller includes an interface configured to provide transient count data to an external device.

Another aspect is directed to a power device. The power device includes an input having a first connection and a second connection and the input is configured to be coupled to an AC power source to receive input AC power, a converter circuit coupled to the input and configured to convert an input AC voltage to a DC voltage, an output configured to provide output power derived from the DC voltage, and means for providing transient voltage protection at the input. The power device may include means for counting a number of transients that have occurred at the input, means for determining the duration of at least one transient, and means for providing an indication of the number of transients.

Another aspect is directed to a transient surge counter circuit. The transient surge counter circuit includes an input having at least a first connection and a second connection and configured to be coupled to an AC input of a device, a capacitor having a first end and a second end with the first end configured to receive a surge from the first connection, a resistor having a first end and a second end with the first end coupled to the second end of the capacitor and the second end coupled to the second connection; and a detection device coupled to the second end of the capacitor and configured to provide an output signal in response to a surge at the input.

In the transient surge counter circuit, the detection device may be configured to provide an indication of a magnitude of the surge at the input. The transient surge counter circuit may include a controller coupled to the detection device, and the controller may include an interface configured to provide transient count data to an external device. The transient surge counter may include a first diode coupled to the first end of the resistor and a second diode coupled to the second end of the resistor, and the detection device may include an opto-coupler.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments and are incorporated in and constitute a part of this specification but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, electronic equipment can be exposed to harmful voltage transients. To protect the equipment from the transients, differential transient protection and common mode transient protection is typically used. Differential surge protection is typically implemented using Class-X capacitors (referred to herein as "X capacitors") connected from each phase to neutral. Common mode surge protection is typically implemented using Class-Y capacitors (referred to herein as "Y capacitor") coupled from each phase and neutral to ground. In addition, transient voltage surge suppressors can be used. Because of their use on input power lines, X capacitors and Y capacitors are designed to meet stringent requirements set forth by Underwriters Laboratory (UL) and other agencies and organizations.

Figure 1:
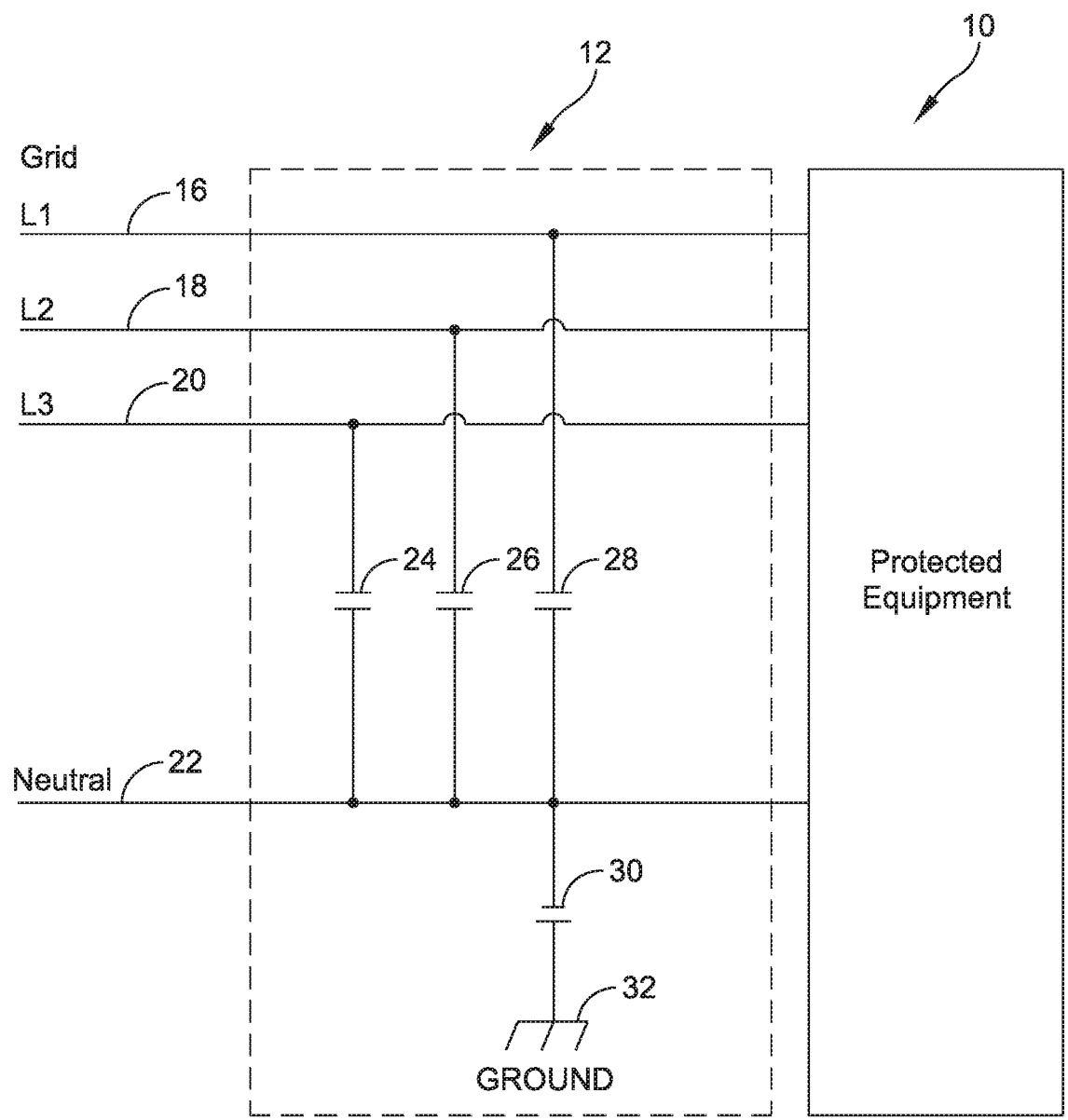
FIG. 1 is a schematic diagram of a typical surge protection device used with electronic equipment.

FIG. 1 shows a diagram of a protected device 10 having a protection circuit 12 using X capacitors and Y capacitors as discussed above. The protected device 10 is configured for 3-phase use and has input phase connections 16, 18 and 20 and an input neutral connection 22. The protection circuit 12 includes X capacitors 24, 26 and 28, each coupled between one of the input phase connections and the neutral connection, and a Y capacitor 30 coupled between the neutral 22 and a ground connection 32.

X capacitors and Y capacitors are designed to fail in a safe manner after wearing out and are relatively expensive and bulky. In addition, X and Y capacitors can typically only withstand a very limited ripple current and are sensitive to high frequency ripple current on a mains grid. Exposure to ripple current may cause the capacitors to degrade over time, and the degradation is typically not detectable.

As discussed below, at least some embodiments of the present invention provide improved transient protection that overcome at least some of the deficiencies noted with transient protection devices like device 12 of FIG. 1. In addition, in at least some embodiments, additional elements are provided in transient protection circuits to provide an efficient technique for detecting and counting the number of surges that have occurred. By tracking the number of surges that have occurred in an electronic device, such as a UPS, preventive maintenance can be scheduled by a contractor prior to the failure of the electronic device. The use of monitoring circuits described below may be used to satisfy new and existing requirements for monitoring the status of devices used in surge protection circuitry (e.g., in a UPS standard).

Figure 2:
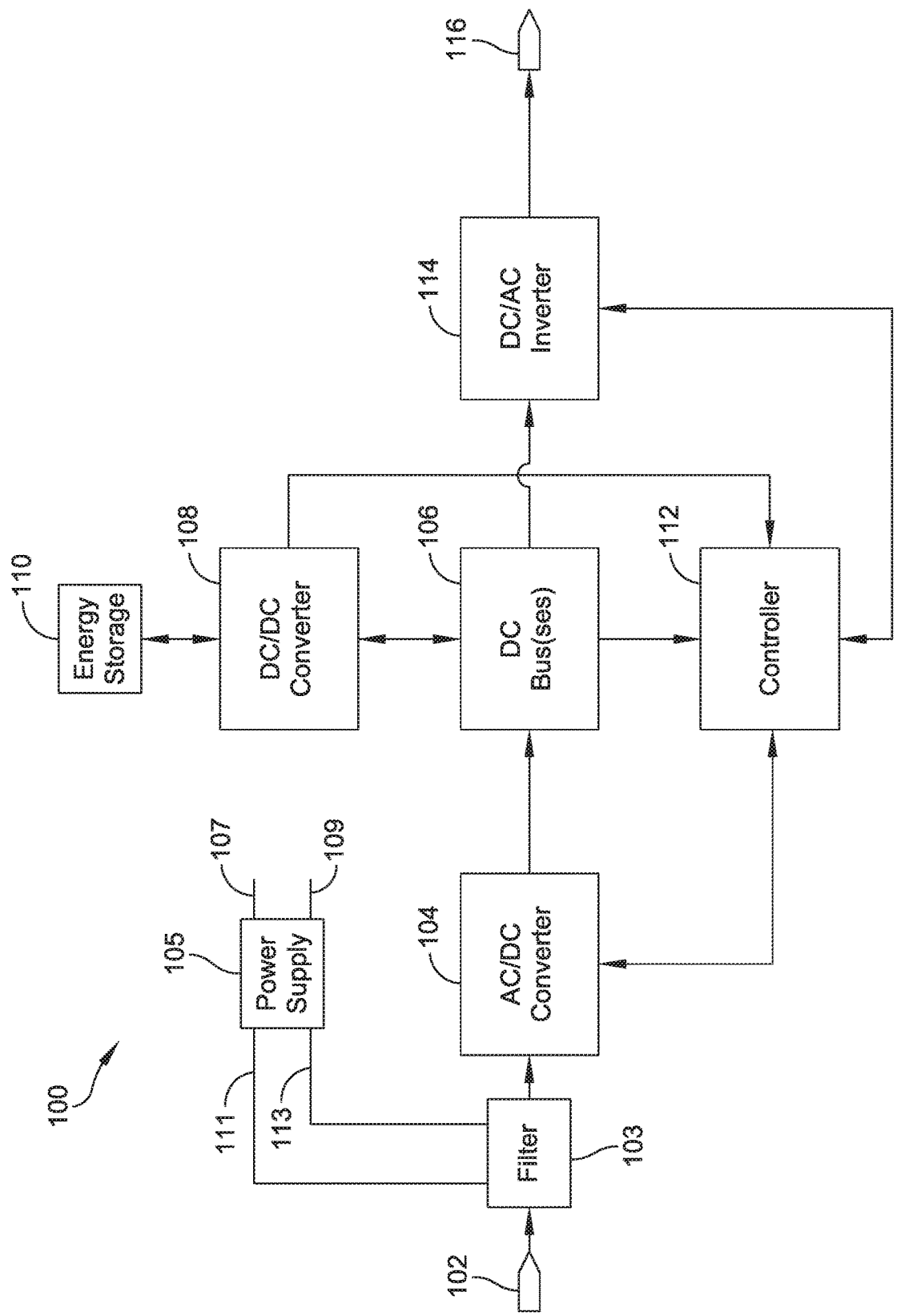
FIG. 2 is a block diagram of a UPS in accordance with one embodiment.

As discussed above, power devices, such as uninterruptible power supplies (UPS), are used to provide regulated, uninterrupted power to sensitive and/or critical loads. FIG. 2 is a block diagram of an Uninterruptible Power Supply (UPS) 100. The UPS 100 includes an input 102, an input filter 103, a power supply unit 105, an AC/DC converter 104, one or more DC busses 106, a DC/DC converter 108, energy storage devices 110, a controller 112, a DC/AC inverter 114, and a load output 116. The input 102 is coupled to the AC/DC converter 104 through the input filter 103. AC/DC converter 104 may be considered a downstream component of UPS 100 relative to input filter 103 because it is downstream relative to input filter 103 (e.g., the filtered input is provided to AC/DC converter 104). The input 102 is also configured to be coupled to an AC power source, such as an AC mains power supply. The AC/DC converter 104 is coupled to the input 102 and to the one or more DC busses 106 and is communicatively coupled to the controller 112. The one or more DC busses 106 are coupled to the AC/DC converter 104, the DC/DC converter 108, and to the DC/AC inverter 114, and are communicatively coupled to the controller 112. The DC/DC converter 108 is coupled to the one or more DC busses 106 and to the energy storage devices 110 and is communicatively coupled to the controller 112. The energy storage devices 110, which may include one or more batteries or other energy storage devices, are coupled to the DC/DC converter 108. The DC/AC inverter 114 is coupled to the one or more DC busses 106 and to the load output 116 and is communicatively coupled to the controller 112. The load output 116 is coupled to the DC/AC inverter 114 and may be coupled to an external load (not pictured). The input filter 103 may be used to provide Electromagnetic Interference (EMI) filtering and may be used to provide surge protection for the UPS. The input filter 103 is described in further detail below. The power supply unit 105 receives power from the input filter 103 on lines 113 and 111 and provides output DC voltages at lines 107 and 109 for use by components within the UPS 100.

The input 102 is configured to be coupled to an AC mains power source and to receive input AC power having an input voltage level. The controller 112 is configured to control operation of the UPS 100 in different modes of operation based on the input voltage level of the AC power provided to the input 102. When the controller 112 determines that AC power provided to the input 102 is acceptable (i.e., by determining that the AC power has parameters that meet specified values), the controller 112 may operate the UPS 100 in a normal mode of operation.

In the normal mode of operation, AC power received at the input 102 is provided to the AC/DC converter 104. The AC/DC converter 104 converts the AC power into DC power and provides the DC power to the one or more DC busses 106. The one or more DC busses 106 distribute the DC power to the DC/DC converter 108 and to the DC/AC inverter 114. The DC/DC converter 108 converts the received DC power and provides the converted DC power to the energy storage devices 110 to charge the energy storage devices 110. The DC/AC inverter 114 receives DC power from the one or more DC busses 106, converts the DC power into regulated AC power, and provides the regulated AC power to the load output 116 to be delivered to a load.

When the controller 112 determines that AC power provided to the input 102 from the AC mains power source is not acceptable (i.e., by having parameters that do not meet specified values), the controller 112 may operate the UPS 100 in a backup mode of operation. In the backup mode of operation, DC power is discharged from the energy storage devices 110 to the DC/DC converter 108. The DC/DC converter 108 converts the received DC power and distributes the converted DC power to the one or more DC busses 106.

During the backup mode of operation, power distributed to the one or more DC busses 106 is provided by the energy storage devices 110, and during the normal mode of operation, power distributed to the one or more DC busses 106 is provided by a power source connected to the input 102. Power distributed to the one or more DC busses 106 is subsequently drawn by the DC/AC inverter 114 to convert the drawn power from DC power to AC power, and to supply the AC power to an external load connected to the load output 116. In different embodiments, the input power may be single-phase or three-phase power, and the output power may also be single-phase or three-phase power.

As discussed above, the controller 112 may control operation of the UPS 100. In some embodiments, the controller 112 may control the UPS 100 according to one or more control algorithms. The one or more control algorithms may be executed in accordance with rules which are programmed into the UPS 100 (e.g., during manufacture). Also, as discussed below, the controller may be used in conjunction with surge protection detection circuitry to count a number of surges that occur on the input power lines, may determine duration of surges, provide an indication of the number of surges, and/or communicate the number of surges to a remote device.

Figure 3:
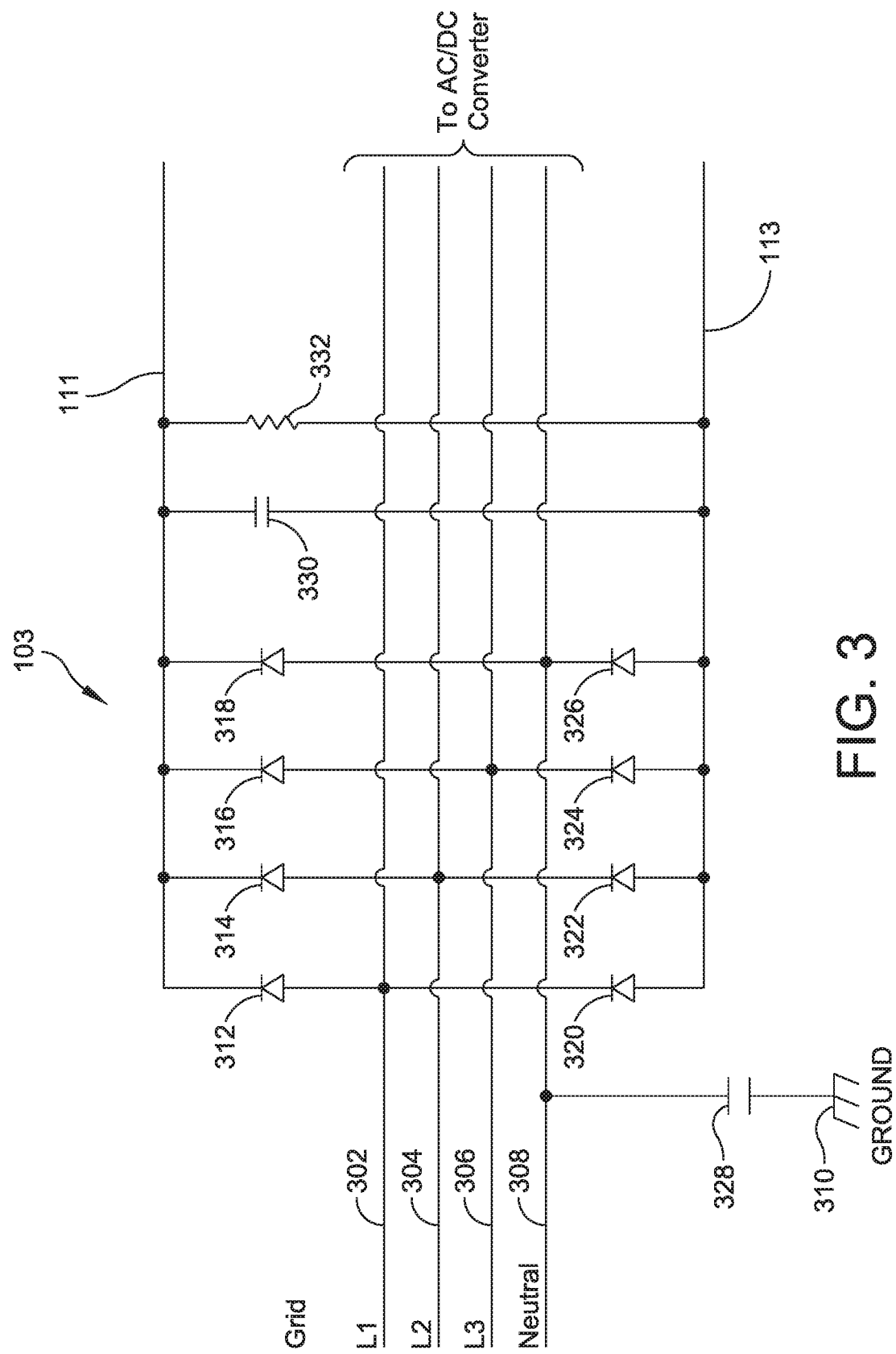
FIG. 3 is schematic diagram of a surge protection circuit used in the UPS of FIG. 2.

The filter 103 of the UPS 100 is shown in FIG. 3 in greater detail. The input filter 103 shown in FIG. 3 is configured for three phase input, however, in other embodiments for single phase use, a single phase filter may be used. It is to be understood that other numbers of phases are possible. The UPS 100 includes three input phase lines 302, 304, 306 and an input neutral line 308 which are coupled between a power grid and input circuitry of the UPS 100. A ground connection 310 is also provided. The filter 103 also includes eight diodes 312, 314, 316, 318, 320, 322, 324, 326. A capacitor 328, a capacitor 330, and a resistor 332.

Diode 312 is coupled between the input phase line 302 and input 111 of the power supply unit 105. Diode 314 is coupled between the input phase line 304 and input 111 of the power supply unit 105. Diode 316 is coupled between the input phase line 306 and input 111 of the power supply unit 105. Diode 318 is coupled between the input neutral line 308 and input 111 of the power supply unit 105. Diode 320 is coupled between the input phase line 302 and input 113 of the power supply unit 105. Diode 322 is coupled between the input phase line 304 and input 113 of the power supply unit 105. Diode 324 is coupled between the input phase line 306 and input 113 of the power supply unit 105. Diode 326 is coupled between the input neutral line 308 and input 113 of the power supply unit 105. In some embodiments, neutral line 308 and diodes 318, 326 may be absent from filter 103 (e.g., when using a delta connection).

Capacitor 328 is coupled between the input neutral 308 and a ground point 310. In some embodiments, ground 310 and capacitor 328 may be absent from filter 103. Capacitor 330 is coupled between input 111 and input 113 of the power supply unit 105. The capacitor 330 may be implemented using a standard DC film capacitor, rather than a X capacitor, since the capacitor 330 is not coupled across the input phase lines. A DC film capacitor can provide much higher capacity per volume and is less expensive than a typical X capacitor. In one embodiment, the capacitor 328 is implemented using a Y capacitor. The resistor 332 is coupled between inputs 111 and 113. The resistor 332 is optional and is used to provide a bleed path for capacitor 330 instead or in addition to a bleed path provided by power supply unit 105 (e.g., in an embodiment without power supply unit 105). A bleed path may facilitate rapidly discharging capacitor 130 when a surge occurs, preparing filter 103 for a subsequent surge event. In some embodiments, no bleed path for capacitor 330 may be provided or a bleed path may be provided in another manner.

In the filter 103, the diodes act as a four-leg bridge filter rectifier. When the filter is coupled to a 400V grid, the nominal voltage across capacitor 330 will be about 566 VDC. If a surge occurs between any of the phases or phase to neutral, which results in a differential voltage above 566 V, the surge will be clamped by capacitor 330. Diode 326 and diode 318 provide a neutral leg to the bridge filter rectifier and ensure that surges on one or more lines (e.g., lines 302, 304, and 306) can be clamped using the capacitor 330. In one embodiment, the diodes 312-326 have a voltage rating corresponding to the largest expected peak voltage across capacitor 330, and in one embodiment for a 4 kV surge design target, the expected peak voltage is 1500 V. For this embodiment, diodes 312-326 are each implemented using two 1000 V 6A axial diodes connected in series.

In the filter 103, since the capacitor 330 may be charged once when the UPS 100 is powered on, the reactive filter currents caused by X capacitors in traditional designs are eliminated, allowing the UPS 100 to obtain a higher power factor (e.g., during low load modes of operation). Another advantage of the filter 103, is that it can be used as a front end for an auxiliary power supply unit as described above, reducing overall cost by eliminating the need for other front end circuits for the power supply unit. The filter 103 can also be used as the front end for other types of power supplies.

In the embodiment described above, and shown in FIG. 3, the power supply unit may act as a bleeder circuit, which will rapidly discharge capacitor 130 when a surge occurs, preparing the filter 103 for a subsequent surge event.

While filter 103 in FIG. 3 has been described with respect to a UPS (e.g., outputting into AC/DC converter 104), it is to be understood that filter 103 may be used to filter the input to other components (e.g., other downstream components relative to filter 103) and in other types of power devices. Further, while lines 111 and 113 of the filter 103 have been described as coupled to the input of a power supply, the filter 103 may also be used as a surge protection circuit for other devices that do not include a power supply.

Figure 4:
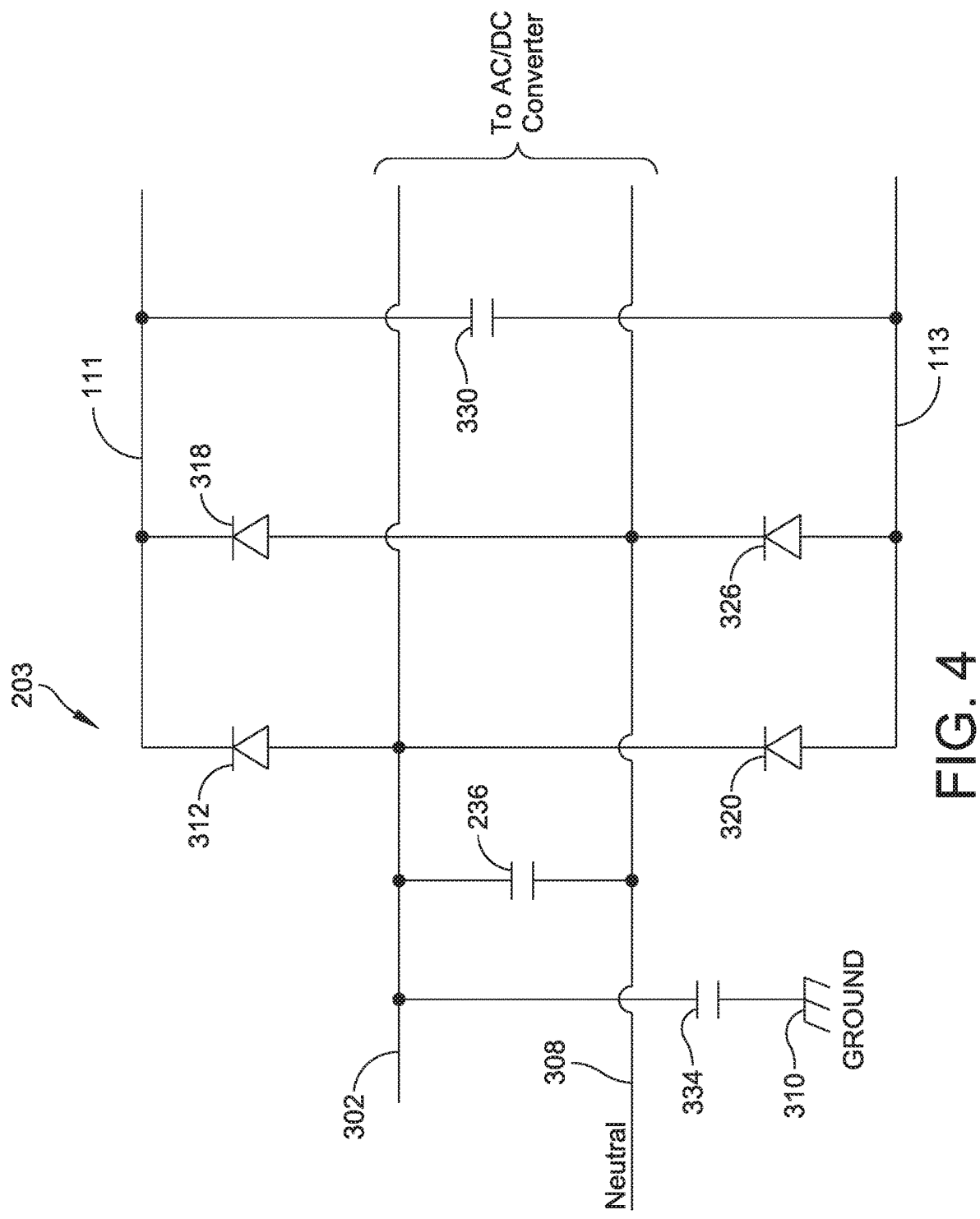
FIG. 4 is a schematic diagram of another embodiment of a surge protection circuit that can be used in the UPS of FIG. 2.

In another embodiment illustrated in FIG. 4, additional capacitors may be added to the filter 103 to provide EMI protection. FIG. 4 shows a schematic diagram of a filter 203 that can be used instead or addition to the filter 103 discussed above. In the filter 203, only one input phase is shown for simplicity, however, the filter 203 may be implemented for a 3-phase system using the four-leg bridge rectifier discussed above with reference to FIG. 3. In FIG. 4, common elements to the filter 103 are labelled with the same reference numbers. The filter 203 is coupled to the input phase line 302 and the input neutral line 308 and is coupled to the input lines 111 and 113 of the power supply unit 105. The filter 203 includes the same diodes 312, 320, 318 and 326 of the filter 103. The filter 203 also includes the capacitor 330 coupled between the input lines 111 and 113. The filter 203 includes an additional capacitor 236 (e.g. an X capacitor) coupled between the input phase line 302 and the input neutral line 308, and also includes a capacitor 334 (e.g. a Y capacitor) coupled between the phase line 302 and ground 310. The capacitors 236 and 334, as well as the ground connection 310 may not be used in all embodiments. In a three-phase implementation, the filter 203 also includes capacitors coupled between the other two phases and neutral. One or more capacitors (e.g. Y capacitors) may be coupled between one or more phases and ground. In one embodiment, the X capacitors are implemented using 6.6 µF capacitors, and the Y capacitors are implemented using 100 nF capacitors.

At least some embodiments of surge protection circuits described herein may allow for the use of smaller and/or less expensive capacitors. In typical systems without one of the proposed surge protection circuits, 20 uF capacitors are typically used between each phase line and ground.

As discussed above, in some embodiments, additional elements are provided in transient protection circuits to provide an efficient technique for detecting and counting the number of surges that have occurred. The addition of monitoring components discussed below will allow UPS's to be monitored and the monitoring information can be used to predict and prevent upcoming failures and used to determine the root cause of a failure. Monitoring may be used to comply with safety standards. Current systems typically lack the ability to efficiently monitor, predict and prevent upcoming failures, and these systems typically cannot determine the root cause of a failure.

It is to be understood that filter 203 may be used to filter the input to different types of components (e.g., downstream components relative to filter 103) and in different types of power devices.

Figure 5:
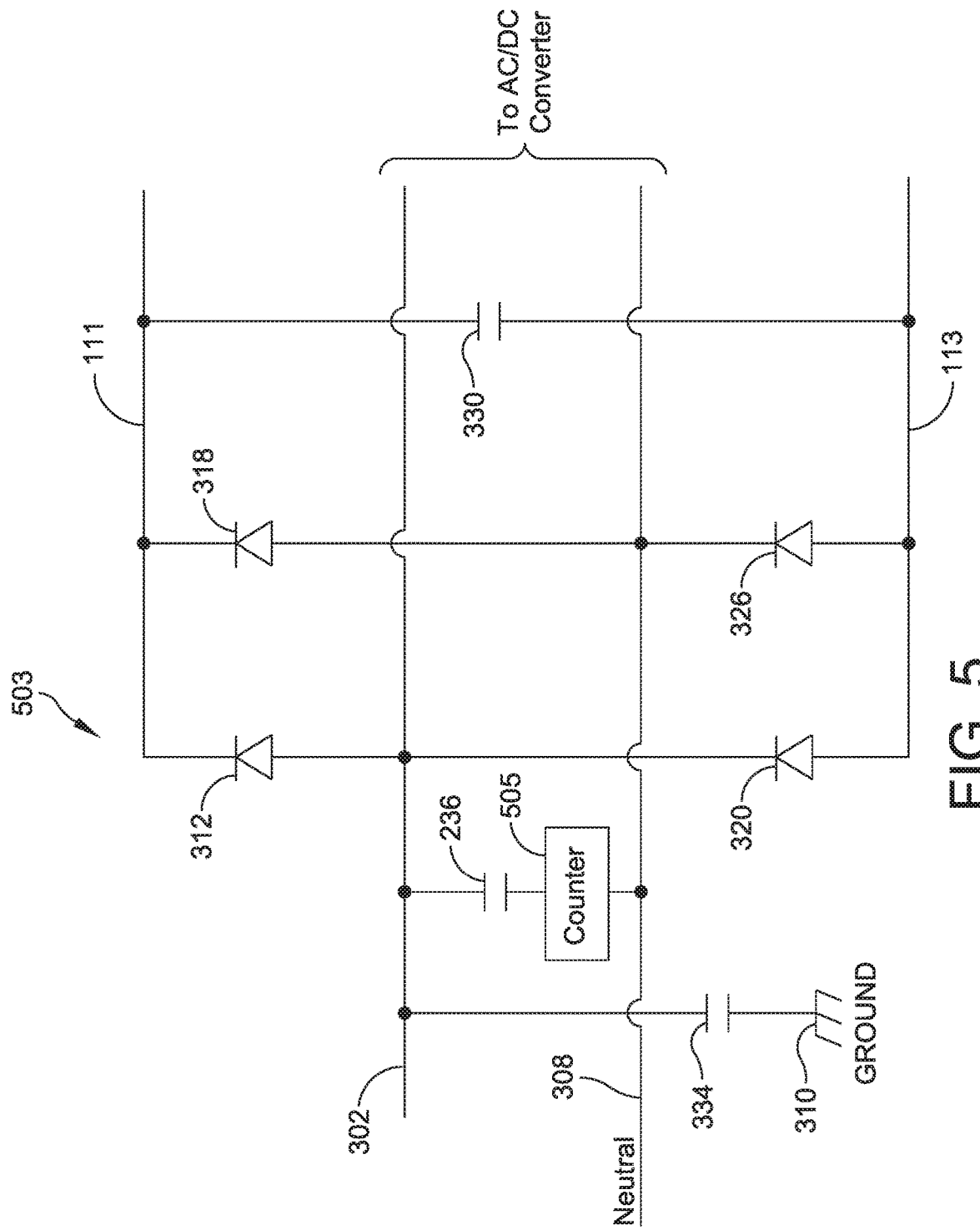
FIG. 5 is a schematic diagram of another embodiment of a surge protection circuit that can be used in the UPS of FIG. 2.

FIG. 5 shows a schematic diagram of a filter system 503 that can be used as the filter 203 described above in the UPS 100 of FIG. 1. The filter system 503 includes filter components, similar to those of filter 203, and a surge counter circuit 505. In the filter 203, only one input phase is shown for simplicity, however, the filter 203 may be implemented for a 3-phase system using the four-leg bridge rectifier discussed above with reference to FIG. 3. In FIG. 5, common elements to the filter 203 of FIG. 4 are labelled with the same reference numbers. The surge counter circuit 505 is coupled between the X capacitor 235 and the neutral line 308.

Figure 6:
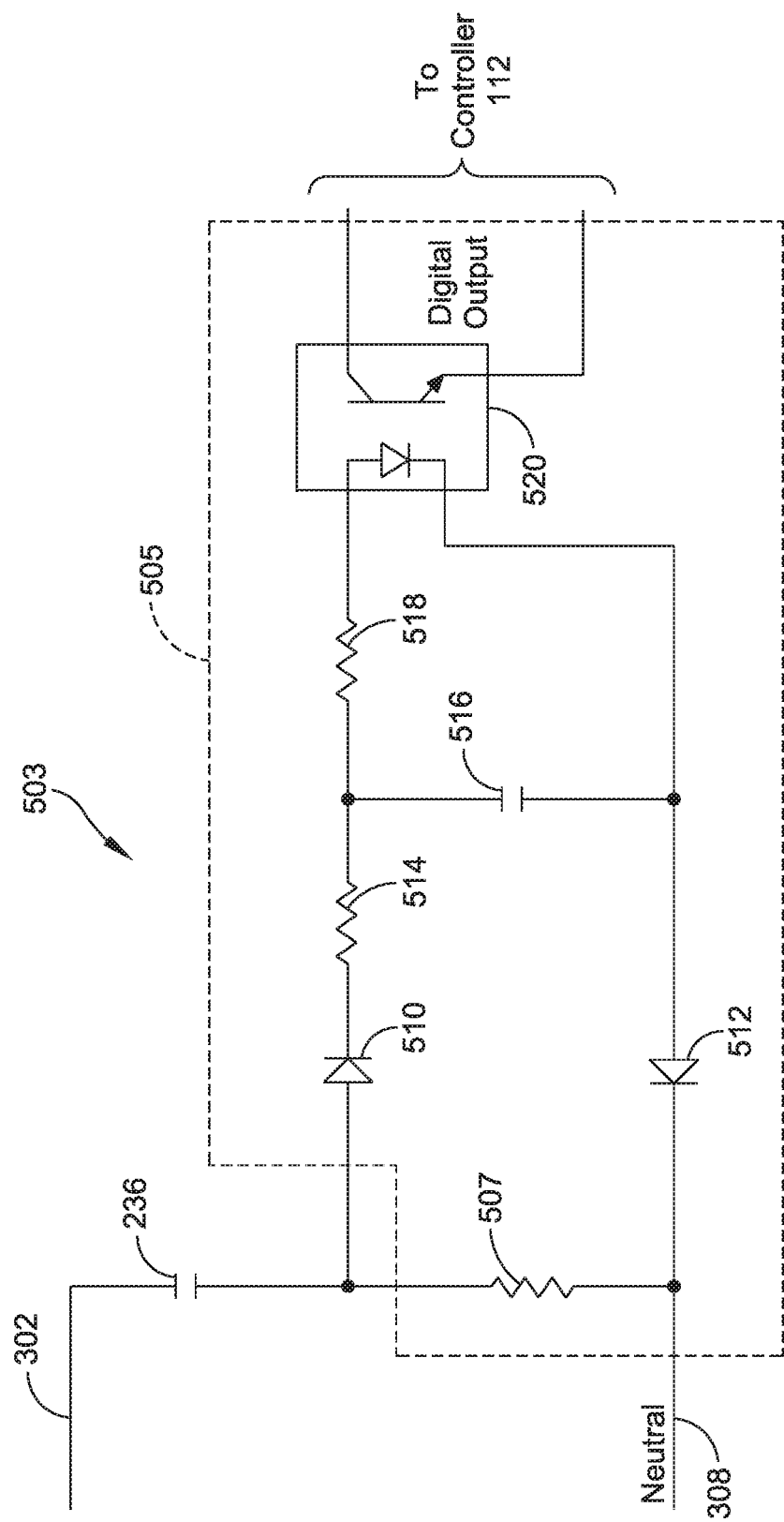
FIG. 6 is a schematic diagram of a surge counter circuit used in the embodiment of FIG. 5.

The surge counter circuit 505 is shown in greater detail in FIG. 6. FIG. 6 also includes portions of the filter system 503 to show the coupling of the surge counter circuit 505 to the filter system 503. The surge counter circuit 505 includes a resistor 507 coupled between the X capacitor 236 and the neutral 308, diodes 510 and 512 resistors 514 and 518, a capacitor 516 and an optocoupler 520. In some embodiments, the positions of capacitor 236 and resistor 507 may be switched with each other.

The resistor 507 is implemented in one embodiment using a Printed Circuit Board trace (e.g. with a low inductance) or a sense resistor in series with the X capacitor 236. Diode 510 has an anode coupled to a junction point of resistor 507 and the X capacitor 236, and the diode 510 has a cathode coupled to a first end of the resistor 514. The second end of the resistor 514 is coupled to a first end of the capacitor 516. Diode 512 has a cathode coupled to the neutral 308 and an anode coupled to the second end of the capacitor 516. The resistor 518 is coupled to the first end of capacitor 516 and a first input of the optocoupler 520. A second input of the optocoupler is coupled to the second end of the capacitor 516. The outputs of the optocoupler are coupled to the controller 112, however, in other embodiments an additional controller or control logic may be coupled to the optocoupler 520, in place of, or in addition to the controller 112.

In operation, when a surge voltage occurs between the input 302 and neutral 308 of the filter 503, a current will start to flow in the X capacitor 236, which will generate a voltage across resistor 507. The voltage across resistor 507 charges the capacitor 516, and when a threshold associated with the optocoupler 520 is exceeded, then the optocoupler will provide an output signal to the controller 112. Depending on the energy associated with a surge appearing across the X capacitor 236, capacitor 516 will be more or less charged, and a digital pulse duration output from the optocoupler will vary accordingly. In addition, in some embodiments, a magnitude of the surge may be determined based on a duration of the output from the optocoupler.

In one embodiment, the controller 112 is programmed to count the number of pulses detected and the duration of the pulses and can provide an indication to a user of the need to replace the capacitors. The indication may be provided based on a determination of how many pulses and of what duration particular capacitors can withstand without severe degradation. The results of controlled tests can be used to determine when capacitors (e.g., X capacitors) in a UPS should be replaced. The indication may be provided from an audible or visual alarm or may be communicated from the UPS to a remote device over a wired or wireless network. The indication may include a number of pulses that have occurred and the duration of each pulse, or may only indicate that a set threshold has been exceeded indicating that the X capacitors should be replaced.

In FIGS. 5 and 6 above, the counter circuit 505 is shown for use with a single-phase input power system, but in other embodiments, the counter circuit may be used with three phase systems or any other multiple phase systems. In a 3-phase system, a resistor, like resistor 507 may be placed in series with each X capacitor and the voltage across the resistors may be used to trigger an optocoupler as described above. A separate optocoupler, and associated circuitry may be used with each X capacitor, or in one embodiment, one optocoupler may be used to count the total number of pulses across each X capacitor. In other embodiments, a resistor like resistor 507 may be placed in series with the capacitor 330 and the voltage across the resistors may be used to trigger an optocoupler as described above.

Figure 7:
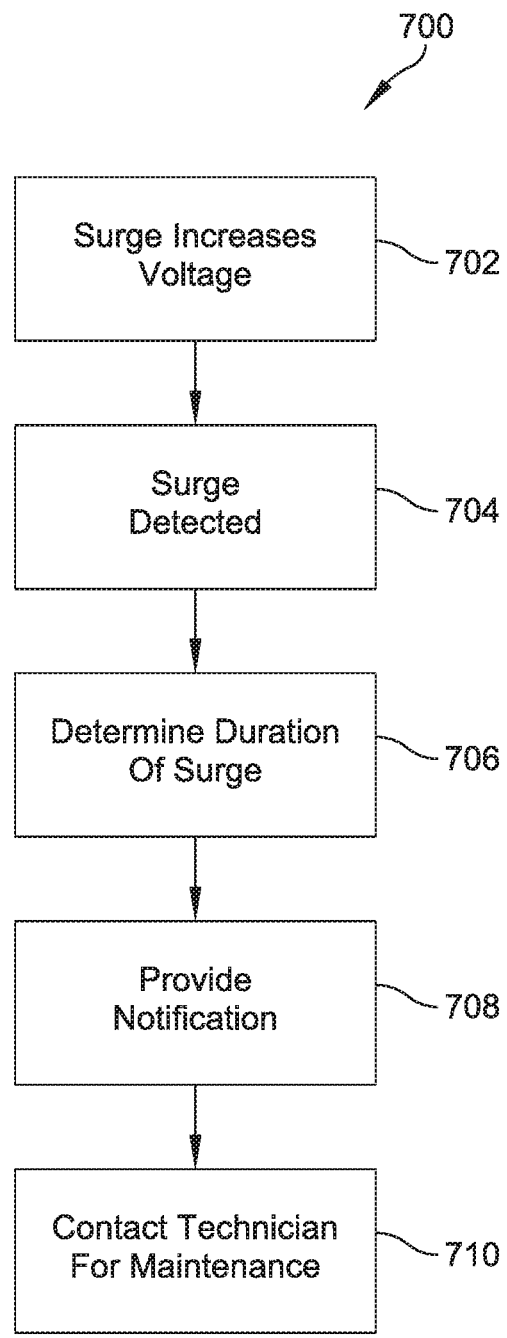
FIG. 7 is a flow diagram of a method for detecting surges in a UPS.

FIG. 7 provides a flowchart of a method 700 for detecting surges in capacitors of a UPS and providing an output to a user with an indication of the number and duration of the surges. In a first act 702, a voltage across an X capacitor in the UPS is increased due to the presence of a surge. In act 704, the surge is detected and an output is provided to a controller or control logic. At act 706, the controller or control logic determines a duration of the pulse and stores an indication that the pulse occurred and the duration of the pulse. A timestamp may also be used to provide an indication of when the surge occurred. At act 708, the controller provides an indication of the number and duration of the pulses. Act 708 may be simply an indication that an overall threshold has been exceeded or act 708 may provide a notification to a remote device of the number of surges that have occurred, the duration of each of the surges, and timestamps associated with the surges. Based on the notification, at act 710 a technician may be contacted to access the UPS and replace one or more X capacitors. The use of the surge counter and the associated method of FIG. 7 provides early indication that the X capacitors may be failing and allows preventative maintenance to occur in a timely manner.

As discussed above, the controller 112 is configured to monitor and control operation of the UPS 100. Using data stored in associated memory, the controller 112 is operable to execute one or more instructions that may result in the manipulation of one or more switches' conductive states. In some examples, the controller 112 can include one or more processors or other types of controllers. The controller 112 may perform a portion of the functions discussed herein on a processor, and perform another portion using an Application-Specific Integrated Circuit (ASIC) tailored to perform particular operations. Examples in accordance with the present invention may perform the operations described herein using many specific combinations of hardware and software and the invention is not limited to any particular combination of hardware and software components.

In embodiments described above, a surge protection circuit and counter are described for use in a UPS. In other embodiments, the surge protection circuit and counter may be used in other types of power distribution devices and other types of power supplies.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A power device comprising:
   an input having at least a first connection and a second connection, and configured to be coupled to an AC power source to receive input AC power;
   a converter circuit coupled to the input and configured to convert an input AC voltage to a DC voltage;
   a load output configured to provide output power derived from the DC voltage;
   a rectifier circuit coupled to the input and having a first output and a second output;
   a power supply coupled to the first output and the second output of the rectifier circuit to receive power from the rectifier circuit; and
   a first capacitor coupled to the first output of the rectifier circuit and the second output of the rectifier circuit.

2. The power device of claim 1, further comprising:
   a second capacitor coupled between the first connection and the second connection.

3. The power device of claim 2, wherein the power device further includes a third capacitor coupled between the first connection and ground.

4. The power device of claim 3, wherein the input further includes a third connection and a fourth connection, and wherein the rectifier circuit is a three-phase rectifier circuit.

5. The power device of claim 2, wherein the first capacitor is a first type of capacitor, and the second capacitor is a different type of capacitor than the first type.

6. The power device of claim 5, wherein the second capacitor is an X capacitor.

7. The power device of claim 2 further comprising a counter circuit coupled to the second capacitor and configured to count a number of transients that occur at the input.

8. The power device of claim 7, wherein the counter circuit is configured to determine a magnitude of a transient.

9. The power device of claim 1, further comprising a backup storage device, and wherein the power device is configured to provide backup power from the backup storage device to the output in a backup mode of operation.

10. A surge protection circuit for protecting a device from power surges, the surge protection circuit comprising:
    an input having at least a first connection and a second connection, and configured to be coupled to an AC input and a downstream component relative to the surge protection circuit;
    a rectifier circuit coupled to the input and having a first output and a second output;
    a first capacitor coupled to the first output of the rectifier circuit and the second output of the rectifier circuit and configured to receive a power surge at the input through the rectifier circuit to protect the device;
    a second capacitor coupled between the first connection and the second connection; and
    a counter circuit coupled to the second capacitor and configured to count a number of transients that occur at the input.

11. The surge protection circuit of claim 10, wherein the surge protection circuit further includes a third capacitor coupled between the first connection and ground.

12. The surge protection circuit of claim 11, wherein the input further includes a third connection and a fourth connection, and wherein the rectifier circuit is a three-phase rectifier circuit.

13. The surge protection circuit of claim 10, wherein the first capacitor is a first type of capacitor, and the second capacitor is a different type of capacitor than the first type.

14. The surge protection circuit of claim 13, wherein the second capacitor is an X capacitor.

15. The surge protection circuit of claim 10, wherein the counter circuit is configured to determine a magnitude of a transient.

16. A power device comprising:
    an input having a first connection and a second connection and configured to be coupled to an AC power source to receive input AC power;

a converter circuit coupled to the input and configured to convert an input AC voltage to a DC voltage;

an output configured to provide output power derived from the DC voltage; and means for providing transient voltage protection at the input including a rectifier circuit having an output; and a power supply coupled to the output of the rectifier circuit.

17. The power device of claim 16, further comprising means for counting a number of transients that have occurred at the input.

18. The power device of claim 17, further comprising means for determining the duration of at least one transient.

* * * * *